March 25, 1924. 1,488,077
W. R. TURNER
CHANGE SPEED GEAR OPERATING MECHANISM
Filed July 6, 1923  2 Sheets-Sheet 1

INVENTOR
ATTORNEY

March 25, 1924.

W. R. TURNER

CHANGE SPEED GEAR OPERATING MECHANISM

Filed July 6, 1923   2 Sheets-Sheet 2

1,488,077

INVENTOR
Walter Raymond Turner
PER
ATTORNEY.

Patented Mar. 25, 1924.

1,488,077

UNITED STATES PATENT OFFICE.

WALTER RAYMOND TURNER, OF COVENTRY, ENGLAND, ASSIGNOR TO THE STANDARD MOTOR COMPANY LIMITED, OF COVENTRY, ENGLAND.

CHANGE-SPEED-GEAR-OPERATING MECHANISM.

Application filed July 6, 1923. Serial No. 649,872.

*To all whom it may concern:*

Be it known that I, WALTER RAYMOND TURNER, a subject of the King of England, residing at Coventry, in the county of Warwick, England, have invented certain new and useful Improvements in Change-Speed-Gear-Operating Mechanism, of which the following is a specification.

This invention relates to change speed gear operating mechanism for motor vehicles of the kind in which the gear box is arranged rather far forward on the vehicle, which is particularly the case on cars having a small power and transmission mechanism. In such cases the change speed lever, which is generally mounted upon or in line with the gear box, is rather far forward and requires either to be cranked or sloped backwards considerably. If the speed lever is in the centre of the vehicle it is then often in the way, particularly on a small vehicle.

It is the object of the present invention to overcome these difficulties and to enable the change speed lever to be easily operated without any inconvenience, although the gear box may be very far forward on the chassis.

A further object is to provide means whereby the member controlled by the driver can be located in different positions transversely to the vehicle.

In the accompanying drawings.

Like letters indicate like parts throughout the drawings, the top of the gear box being shown at Z.

Figure 1:
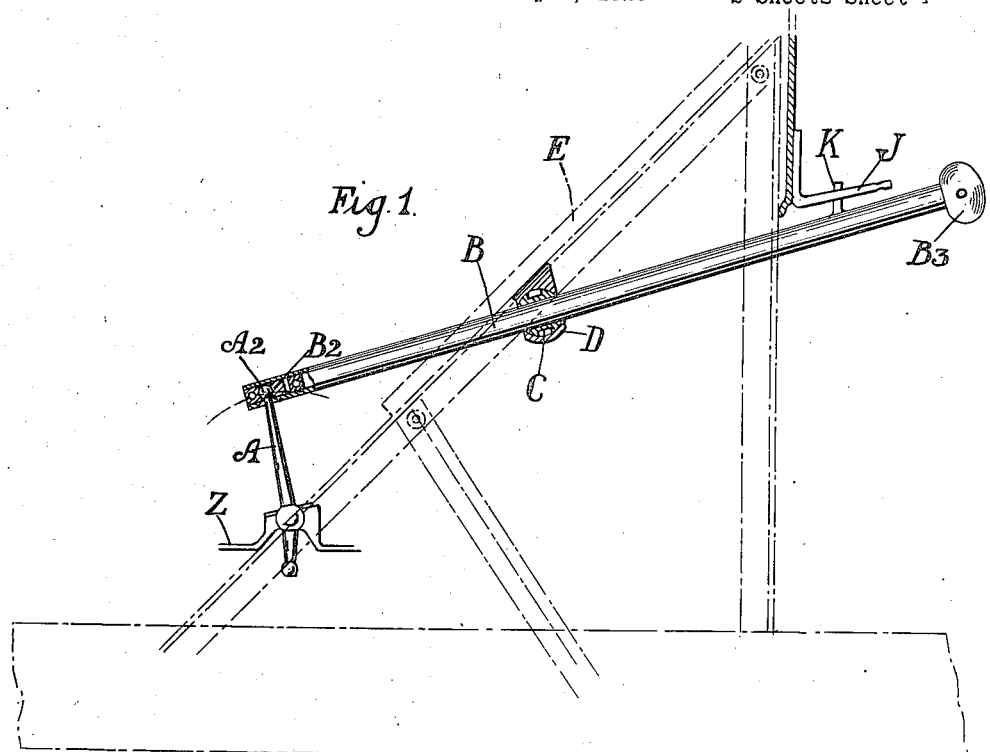
Figure 1 is a side elevation partly in section showing one means for carrying out this invention.
Figure 3:
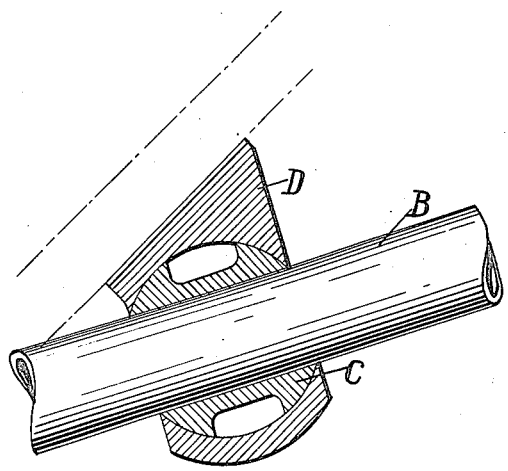
Figure 3 is an enlarged view showing a detail.
Figure 4:
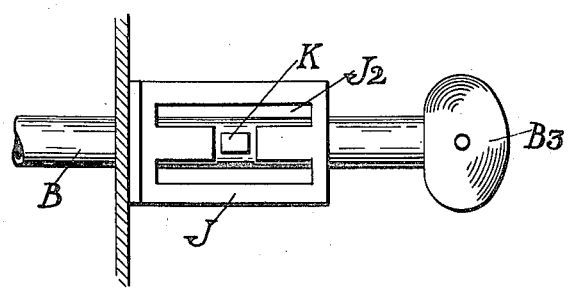
Figure 4 is a plan of a detail.

In the construction shown in Figures 1 and 3, the change speed lever A is mounted on the gear box lid Z and terminates at the upper end in a ball A², and this lever is adapted, as is usual, to be rocked or otherwise moved sideways for selection, and to be moved in a longitudinal direction (as regards the vehicle), to effect change of gear.

The ball A² lies in a socket housing B² on the rod B, which extends backwards a suitable distance and terminates in some convenient form of grip B³ close to the driver.

The only support for the rod B is in a ball and socket bearing C, D, attached to some convenient part of the vehicle, such as the dashboard E. Thus the rod may have a bearing fit in a hole in the ball C which is free to twist in a socket housing D, provided with a bracket to enable it to be attached to the dashboard, steering column, or elsewhere.

To effect selection, the rod B is rocked sideways which moves the change speed lever sideways. Then a pull or push imparted to the rod will effect engagement of the required gear.

It will be clear that little or no fitting is required, as accurate lining up or adjustment is not necessary. Further, the socket D need not be arranged in the same longitudinal plane as the change speed lever A. For example, it may be arranged on the right hand side of the vehicle, when the grip B³ on the sliding rod will lie close to the driver's right hand. Or the rod may be arranged centrally or on the left hand side of the vehicle.

Figure 2:
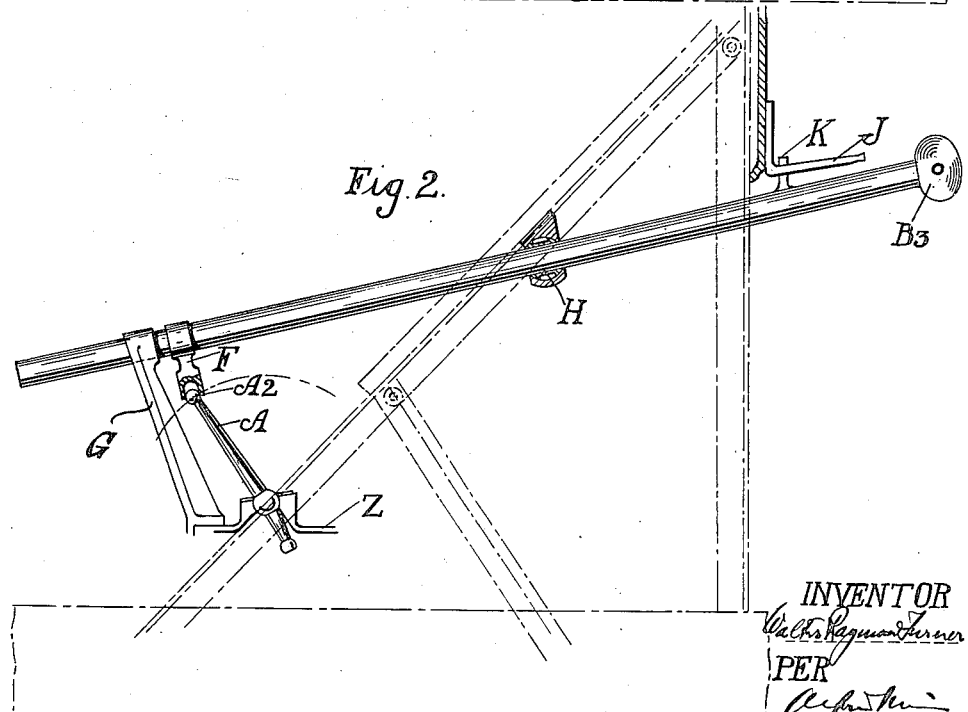
Figure 2 is a similar view of a modification.

The construction shown in Figure 2 is much the same except that the ball A² on the speed lever A engages a deep cup or socket in an arm F on the rod B. The rod B is supported in a bracket G and at H a plain bearing alone is required. In this case the rod is twisted to effect selection and pulled or pushed to effect changes of gear.

Thus, a very simple construction is provided enabling the change speed lever to be a short straight arm located far forward.

If desired, there may be arranged above the grip, or at any other suitable point, a plate J with markings or other indications showing the directions of movement required to effect the various changes of gear.

For example, the plate J may have in it an H-shaped slot J² in which works a finger K, the movement of which is similar to that of an ordinary speed lever in an H quadrant, as is usually nowadays used on motor vehicles.

What I claim as my invention and desire to secure by Letters Patent of the United States is:—

1. In a change speed gear mechanism for motor vehicles, the combination with a universally mounted change speed lever, of a rod having a ball-and-socket connection with said lever and running through the dash-board, and a universal bearing for said rod in said dash-board.

2. In a change speed gear mechanism for motor vehicles, the combination with a universally mounted gear-shift lever, of a control rod loosely connected at its end to the top of said lever, and a bearing on the vehicle for said rod, the same consisting of an apertured ball and a fixed socket for said ball.

In testimony whereof I have signed my name to this specification in the presence of two subscribing witnesses.

WALTER RAYMOND TURNER.

Witnesses:
C. CUTHBERT,
W. M. DESTER.